United States Patent Office 3,131,179
Patented Apr. 28, 1964

3,131,179
NEW HETEROCYCLICALLY SUBSTITUTED STEROIDS
Karl Hoffmann and Jules Heer, Binningen, Switzerland, assignors to Ciba Corporation, a corporation of Delaware
No Drawing. Filed Oct. 1, 1957, Ser. No. 687,370
Claims priority, application Switzerland Oct. 3, 1956
18 Claims. (Cl. 260—239.5)

This invention relates to 20-hydroxy-pregnane-compounds which contain in 20-position a pyridyl or piperidyl radical bound through a carbon atom of a lower hydrocarbon radical, for example, the carbon atom of the methylene, methyline or ethylidene group, their esters and salts thereof.

More particularly the invention concerns 20-hydroxy-pregnane-compounds as indicated above which contain in the 20-position the radical

in which $R_1$ represents hydrogen or a lower alkyl group such as the methyl group, and $R_2$ represents a pyridyl or piperidyl radical, which is preferably bound in the 2-position to the carbon atom of the radical of the above formula.

These pregnane compounds substituted in a novel manner in the 20-position may belong, more especially, to the pregnane or allopregnane series. These steroids may be homo- and/or nor-compounds and may be saturated or unsaturated.

The new compounds may contain substituents. Thus they may be substituted in the steroid portion by free or esterified hydroxyl group or free or functionally converted oxo groups or by halogen atoms. The piperidyl nitrogen atom may be substituted by an alkyl, acyl or aralkyl radical. As esterified hydroxyl groups there are contemplated more particularly hydroxyl groups esterified with an aliphatic, alicyclic, araliphatic, aromatic or heterocyclic carboxylic acid, thion-carboxylic acid, oxy-carboxylic acid or sulfonic acid with 1–20 carbon atoms, As acids there may be mentioned, unsubstituted or halogen or hydroxy substituted fatty acids such as acetic acid, chloracetic acid, trifluoracetic acid, propionic acid, butyric acid, valeric acids, trimethyl-acetic acid, diethyl-acetic acid, caproic acids, oenanthic acids, capric acids, palmitic acid, undecanic acids, undecylenic acid, crotonic acid, oxalic acid, succinic acid, pimelic acid, maleic acid, lactic acid or carbamic acids, β-cyclopentyl-propionic acid, benzoic acid, phenylacetic acid, cyclohexyl acetic acid, furane-2-carboxylic acid, methane sulfonic acid and toluene sulfonic acids. The hydroxyl group in the 20-position may also be esterified with one of the aforesaid acids, for example, lower fatty acids e.g. acetic acid. A functionally converted oxo group is more especially a ketalized oxo group, for example, the methylene-dioxy group. As N-substituents lower alkyl radicals or acyl radicals of lower fatty acids, benzoic acids or simple aryl-fatty acids, e.g. the methyl group or acetyl group are preferred.

The new compounds possess valuable pharmacological properties. Thus they possess a cardiac action and more particularly a coronary dilatatory effect and can accordingly be used as medicaments.

Especially valuable are pregnane and allopregnane compounds of the aforesaid kind, which are oxygenated in 3-position, e.g. contain in the 3-position a free or esterified hydroxyl group or a free or functionally converted oxo group. The 21-position may be unsubstituted or contain a free or esterified hydroxyl group. These compounds may contain double bonds; for example a double bond starting from the 5-carbon atom. Specific and preferred embodiments of the invention are for example:

$\Delta^5$-3β:20-dihydroxy-20-methyl - 21 - pyridyl-(2')-pregnene of the formula

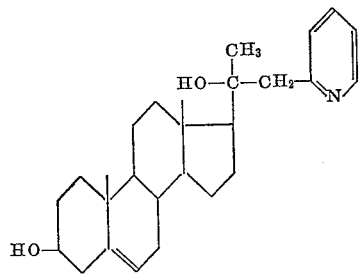

$\Delta^{5:16}$-3β:20-dihydroxy - 20 - methyl - 21 - pyridyl-(2')-pregnadiene of the formula

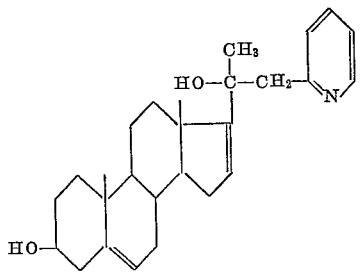

3β:20-dihydroxy-20-methyl - 21 - piperidyl-(2')-allopregnane of the formula

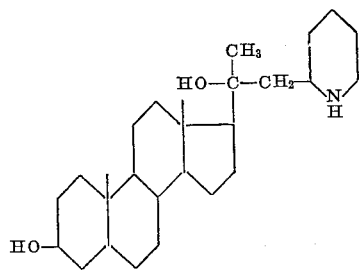

their acetyl and N-methyl-derivatives and their salts.

The invention also provides a process for the manufacture of the aforesaid new compounds, wherein a 20-oxo-steroid, especially one containing in the 3-position a free or esterified hydroxyl group of functionally converted oxo group, is reacted with a 1-pyridyl-alkyl-lithium compound, preferably a 1-pyridyl-(2')-allkyl-lithium such as picolyl-(2)-lithium or 1-pyridyl-(2')-ethyl-lithium. The pyridyl compound so obtained may be treated with an agent capable of reducing the pyridine ring. At any stage of the process and in any desired order of succession there may further be esterified free hydroxyl groups or functionally converted oxo group or liberated an esterified hydroxyl or functionally converted oxo group or a hydroxyl group oxidized to an oxo group, an oxo group reduced to a hydroxyl group, hydroxyl or oxo groups removed or introduced. A compound so obtained may be N-substituted or an N-acylated compound hydrolyzed. A base so obtained may be converted into a salt thereof or a salt so obtained converted into the free base.

The reaction with the pyridyl-alkyl-lithium compound, especially picolyl-lithium or 1-pyridyl-(2')-ethyl-lithium, is carried out in the usual manner, for example, in an inert diluent, and the reaction mixture is worked up in a customary manner, for example, in an acid medium. When acyloxy groups are present in the molecule, they are split up thereby to form free hydroxyl groups.

As agents capable of reducing the pyridine ring there may be mentioned principally hydrogen in the presence of a catalyst, preferably a noble metal catalyst such as platinum, or nickel or copper chromite, and also nascent hydrogen such, for example as is produced by treating sodium with an alcohol, for example, butanol, or lithium with liquid ammonia. The reactions which may be carried out, in the steroid radical or at the nitrogen atom, such as hydrolysis of an acyloxy group, oxidation of a hydroxyl group to an oxo group, N-acylation or N-alkylation, are carried out by the usual methods. Other groups not intended to undergo reaction may be protected. The new compounds are obtained, depending on the reaction conditions, in the form of their free amine bases or salts thereof. The free bases can be converted by customary methods into their therapeutically useful acid addition salts, and the latter can be converted by methods in themselves known into the free bases. As salts there may be mentioned those of inorganic or organic acids, for example, hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, oxyethane sulfonic acid, benzene or toluene sulfonic acid or therapeutically active acids.

The new compounds can be used as medicaments, for example, in the form of pharmaceutical preparations which contain the compound or a salt thereof in admixture with a pharmaceutical organic or inorganic carrier suitable for enteral or parenteral administration. For making the carriers there are used substances which do not react with the new compounds, for example, water, gelatine, lactose, starches, magnesium stearate, talc, vegetable oils, benzyl alcohols, gums, polyalkylene glycols, white petroleum jelly, cholesterol or another carrier known for medicaments. The pharmaceutical preparations may be in the form, for example, of tablets, dragees, or in liquid form as solutions, suspensions or emulsions. If desired, they may be sterilized and/or may contain auxiliary substances, such as preserving, stabilising, wetting or emulsifying agents, salts for regulating the osmotic pressure or buffers. They may also contain other therapeutically active substances.

The starting materials are known or can be made by methods in themselves known.

The following examples illustrate the invention:

Example 1

A solution of 17.6 grams of $\Delta^5$-3$\beta$-acetoxy-pregnene-20-one in 80 cc. of benzene is run at 20–30° C. into a picolyl-lithium solution prepared from 2.3 grams of lithium in 200 cc. of ether, 26.5 grams of bromobenzene and 18 grams of $\alpha$-picoline. The orange-red picolyl-lithium solution loses its color and a thick precipitate is formed. When the addition is complete, the reaction solution is heated at the boil for ¼ hour and decomposed with 200 cc. of 2 N-hydrochloric acid after being cooled. The precipitate so obtained is a sparingly soluble hydrochloride, which is then filtered off with suction and dissolved in 200 cc. of methanol. Finally, the free $\Delta^5$-3$\beta$:20-dihydroxy-20-methyl-21-pyridyl-(2')-pregnene is precipitated from the latter solution by means of ammonia. It is acetylated in the usual manner with 50 cc. of pyridine and 30 cc. of acetic anhydride. There is obtained $\Delta^5$-3$\beta$-acetoxy-20-hydroxy-20-methyl-21-pyridyl-(2')-pregnene in the form of small lamellae melting at 215–219° C.

By using 17.5 grams of $\Delta^{5,16}$-3$\beta$-acetoxy-pregnadiene-20-one and working up in the same manner there is obtained $\Delta^{5,16}$-3$\beta$:20-dihydroxy-20-methyl-21-pyridyl-(2')-pregnadiene, of which the 3-O-acetyl-compound crystallises in small needles melting at 147–250° C. and has the specific rotation $[\alpha]_D^{26}=-82°$ (in chloroform).

Example 2

A solution of 12.0 grams of $\alpha$-ethyl-pyridine in 50 cc. of ether is added dropwise at about 30° C. to a solution of phenyl-lithium prepared from 1.4 grams of lithium, 17 grams of bromobenzene and 200 cc. of ether. After half an hour a solution of 8.9 grams of $\Delta^5$-3$\beta$-acetoxy-pregnene-20-one in 300 cc. of benzene and 300 cc. of ether is added. A thick precipitate is formed.

When the reaction is complete, a solution of 40 cc. of concentrated hydrochloric acid and 400 cc. of methanol is added to the reaction mixture and the acid solution is separated in the separating funnel. Aqueous ammonia is added to the acid solution and the free base formed is taken up in ether. After drying, the ether solution is evaporated to dryness. The residue (7.9 grams) is acetylated in 40 cc. of pyridine and 20 cc. of acetic anhydride. After being allowed to stand for 12 hours, the acetylation solution is mixed with water and the crude base formed is suction-filtered. When recrystallized from acetone the leaflets of $\Delta^5$-3$\beta$-acetoxy-20-hydroxy-20:21-dimethyl-21-pyridyl-(2')-pregnane melt at 205–207° C.

Example 3

4.65 grams of $\Delta^5$-3$\beta$-acetoxy-20-hydroxy-20:21-dimethyl-21-pyridyl-(2')-pregnene in 50 cc. of glacial acetic acid are agitated in the presence of 200 milligrams of platinum oxide at room temperature under hydrogen. In the course of 17 hours 920 cc. of hydrogen, corresponding to 4 mols, are taken up. The catalyst is filtered off, the colorless filtrate is concentrated in vacuo and the free steroid base is precipitated with dilute aqueous ammonia. The precipitate is then taken up in ether and washed in the usual manner with dilute sodium carbonate solution and water. After distilling off the ether there remain 4.6 grams of crude 3$\beta$-acetoxy-20-hydroxy-20:21-dimethyl-21-piperidyl-(2')-allopregnane which, when recrystallized from a mixture of ether and acetone, melts at 160–164° C. and has the specific rotation $[\alpha]_D^{23}=0°$. With the aid of dilute hydrochloric acid the hydrochloride is obtained from this base and with acetic acid its acetate.

Example 4

3 grams of 3$\beta$-acetoxy-20-hydroxy-20:21-dimethyl-21-piperidyl-(2')-allopregnane are heated for 3 hours in a solution of 4 cc. of formaldehyde of 40% strength and 4 cc. of absolute formic acid in a bath at 120° C. The mixture is then concentrated in vacuo, the residue is mixed with an excess of ammonia and the base formed is taken up in ether. After drying, the ether solution is evaporated and the residue recrystallized from a mixture of acetone and methanol. N-methyl-3$\beta$-acetoxy-20-hydroxy-20:21-dimethyl-21-piperidyl-(2')-allopregnane crystallizes in the form of long needles melting at 212–213° C.

Example 5

2.1 grams of $\Delta^5$-3$\beta$-acetoxy-20-hydroxy-20-methyl-21-pyridyl-pregnene in 50 cc. of glacial acetic acid are agitated in the presence of 200 milligrams of platinum oxide at room temperature under hydrogen. In the course of 5 hours 444 cc. of hydrogen, corresponding to 4 mols, are taken up. The catalyst is filtered off, the colorless filtrate is concentrated in vacuo and the free steroid base is precipitated with dilute aqueous ammonia. The precipitate is then taken up in ether and washed in the usual manner with dilute sodium carbonate solution and water. After distilling off the ether there remain 2.2 grams of crude 3$\beta$-acetoxy-20-hydroxy-20-methyl-21-piperidyl-(2')-allopregnane, which when recrystallized from a mixture of acetone and isopropylether melts at 191–193° C.

Example 6

3 grams of 3$\beta$-acetoxy-20-hydroxy-20-methyl-21-piperidyl-(2')-allopregnane are heated for 3 hours in a solution of 4 cc. of formaldehyde of 40% strength and 4 cc. of absolute formic acid in a bath at 120° C. The mixture is then concentrated in vacuo, the residue is mixed with an excess of ammonia and the base formed is taken up in ether. After drying, the ether solution is evaporated and the residue recrystallized from a mixture of acetone and methanol. N-methyl-3β-acetoxy-20-hydroxy-20-methyl-21-piperidyl-(2') - allopregnane crystallizes in the form of long needles melting at 147–150° C.

What is claimed is:
1. Δ⁵-3β:20β-dihydroxy - 20 - methyl - 21 - pyridyl-(2')-pregnene.
2. A 3-O-acetic acid ester derivative of the compound claimed in claim 1.
3. Therapeutically useful acid addition salts of the compound claimed in claim 1.
4. Δ⁵-3β:20β-dihydroxy - 20:21 - dimethyl-21-pyridyl-(2')-pregnene.
5. A 3-O-acetic acid ester derivative of the compound claimed in claim 4.
6. Therapeutically useful acid addition salts of the compound claimed in claim 4.
7. 3β:20β-dihydroxy - 20 - methyl-21-piperidyl-(2')-allopregnane.
8. A 3-O-acetic acid ester derivative of the compound claimed in claim 7.
9. Therapeutically useful acid addition salts of the compound claimed in claim 7.
10. 3β:20β-dihydroxy - 20:21 - dimethyl - 21 - piperidyl-(2')-allo-pregnane.
11. A 3-O-acetic acid ester derivative of the compound claimed in claim 10.
12. Therapeutically useful acid addition salts of the compound claimed in claim 10.
13. N - methyl-3β-acetoxy - 20β - hydroxy-20:21-dimethyl-21-piperidyl-(2')-allo-pregnane.
14. Therapeutically useful acid addition salts of the compound claimed in claim 13.
15. N-methyl - 3β - acetoxy-20β-hydroxy-20-methyl-21-piperidyl-(2')-allo-pregane.
16. Therapeutically useful acid addition salts of the compound claimed in claim 15.
17. A member selected from the group consisting of a compound of the formula

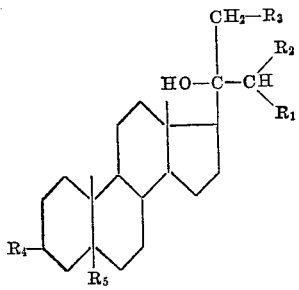

in which $R_1$ represents a member selected from the group consisting of hydrogen and lower alkyl, $R_2$ represents a member selected from the group consisting of 2-pyridyl, 2-piperidyl, R-(N-lower alkyl)-piperidyl and 2-(N-acyl)-piperidyl, $R_3$ represents a member selected from the group consisting of hydrogen, hydroxy and acyloxy, $R_4$ represents a member selected from the group consisting of hydrogen and hydroxy, and hydrogen and acyloxy, and $R_5$ represents a member selected from the group consisting of α-positioned hydrogen and β-positioned hydrogen, the acyl radical mentioned being derived from an organic acid containing 1–20 carbon atoms and therapeutically useful acid addition salts thereof.

18. A member selected from the group consisting of a compound of the formula

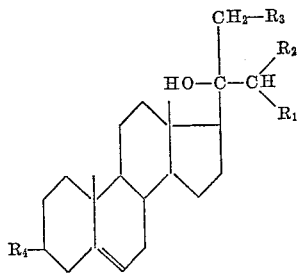

in which $R_1$ represents a member selected from the group consisting of hydrogen and lower alkyl, $R_2$ represents a member selected from the group consisting of 2-pyridyl, 2-piperidyl, 2-(N-lower alkyl)-piperidyl and 2-(N-acyl)-piperidyl and each of the symbols $R_3$ and $R_4$ represents a member selected from the group consisting of hydroxy and acyloxy, the acyl radical being derived from an organic acid containing 1–20 carbon atoms and therapeutically useful acid addition salts thereof.

References Cited in the file of this patent
UNITED STATES PATENTS
2,753,341    Dodson _____ July 3, 1956

OTHER REFERENCES
Journal of Pharmacological Exptl. Therap., vol. 102 pp. 261–8 (1951), Krayer et al.
Helvetica Chim. Acta, vol. 39 (1956), pp. 1804–13, article by Hoffman et al.
Helvetica Chimica Acta, vol. 39, (1956), pages 18–4–13, Heer et al.